US012745874B2

(12) United States Patent
Itzkowitz et al.

(10) Patent No.: US 12,745,874 B2
(45) Date of Patent: Sep. 29, 2026

(54) COFFEE MACHINE FOR HOT AND ICED COFFEE

(71) Applicant: The Steelstone Group LLC, Brooklyn, NY (US)

(72) Inventors: Binyumen Itzkowitz, Brooklyn, NY (US); Meilech Friedman, Brooklyn, NY (US); Joseph Deutsch, Brooklyn, NY (US); Kalman Wertzberger, Brooklyn, NY (US); Robyn De Luca, Queens, NY (US); Wenhui Huang, Brooklyn, NY (US)

(73) Assignee: The Steelstone Group LLC, Brooklyn, NY (US)

( * ) Notice: Subject to any disclaimer, the term of this patent is extended or adjusted under 35 U.S.C. 154(b) by 885 days.

(21) Appl. No.: 18/081,384

(22) Filed: Dec. 14, 2022

(65) Prior Publication Data

US 2023/0218108 A1 Jul. 13, 2023

Related U.S. Application Data

(60) Provisional application No. 63/297,488, filed on Jan. 7, 2022.

(51) Int. Cl.

*A47J 31/44* (2006.01)
*A47J 31/10* (2006.01)
*A47J 31/54* (2006.01)

(52) U.S. Cl.

CPC ........... *A47J 31/4453* (2013.01); *A47J 31/10* (2013.01); *A47J 31/4439* (2013.01); *A47J 31/54* (2013.01)

(58) Field of Classification Search

CPC .... A47J 31/4453; A47J 31/10; A47J 31/4439; A47J 31/54; A47J 31/057; A47J 31/4403

See application file for complete search history.

(56) References Cited

U.S. PATENT DOCUMENTS

| | | | | |
|---|---|---|---|---|
| 4,330,702 | A | 5/1982 | Cheng | |
| 4,356,381 | A | 10/1982 | Flaherty, Jr. et al. | |
| 4,508,023 | A | 4/1985 | Naya et al. | |
| 5,724,883 | A * | 3/1998 | Usherovich ............. | A47J 31/46 99/290 |

(Continued)

FOREIGN PATENT DOCUMENTS

| | | | |
|---|---|---|---|
| CA | 2058854 | A1 * | 2/1993 |
| EP | 1 108 386 | A1 | 6/2001 |
| EP | 1 747 738 | A1 | 1/2007 |

OTHER PUBLICATIONS

IP.com search (Year: 2025).*

(Continued)

*Primary Examiner* — Justin C Dodson
*Assistant Examiner* — Keith Brian Assante
(74) *Attorney, Agent, or Firm* — Myers Wolin, LLC

(57) ABSTRACT

A coffee machine is provided which includes a hot water source for providing hot water for brewing, a warming plate for warming a receptacle for receiving coffee, and a heating element for heating both water at the hot water source and the warming plate. Also provided is a removable insulator for insulating the warming plate from the receptacle. The removable insulator insulates the warming plate from the receptacle in an iced coffee configuration and the removable insulator is removed from the warming plate in a hot coffee configuration.

7 Claims, 6 Drawing Sheets

(56) References Cited

U.S. PATENT DOCUMENTS

| | | | | |
|---|---|---|---|---|
| 5,943,945 | A * | 8/1999 | Ishihara | A47J 31/10 99/290 |
| 2005/0103203 | A1 | 5/2005 | Takizawa | |
| 2007/0017377 | A1 | 1/2007 | Takizawa et al. | |
| 2014/0013958 | A1 | 1/2014 | Krasne et al. | |
| 2016/0073819 | A1 * | 3/2016 | Licare | A47J 31/467 99/300 |
| 2020/0129001 | A1 * | 4/2020 | Romandy | A47J 31/10 |
| 2023/0339235 | A1 * | 10/2023 | Jacobi | B41J 3/40731 |

OTHER PUBLICATIONS

International Search Report and Written Opinion issued by the International Searching Authority for International Patent Application No. PCT/US22/51648, mailed on Feb. 24, 2023.

European Search Report with written opinion issued by the European Patent Office for European Patent Application No. 22919185.3, dated Oct. 27, 2025.

* cited by examiner

COFFEE MACHINE FOR HOT AND ICED COFFEE

CROSS-REFERENCE TO RELATED APPLICATION

This application takes priority from U.S. Provisional Patent Application No. 63/297,488 filed Jan. 7, 2022, the contents of which are incorporated by reference herein in their entirety.

FIELD OF THE INVENTION

The invention relates to a coffee machine for use in making both hot and iced coffee.

BACKGROUND

Many coffee machines are designed for both brewing coffee and keeping coffee warm after brewing. As such, coffee machines often include a warming pad or plate integrated into a base of the coffee machine. Accordingly, hot water is provided to a brewing chamber, where coffee is brewed and dispensed. A receptacle, such as a carafe, for receiving coffee in the coffee machine then rests on top of the warming plate and below a dispenser for dispensing coffee from the brewing chamber.

In many such coffee machines, a single heating element is provided for both heating water for use in brewing the coffee and the warming plate. This works well for brewing hot coffee. However, if a user wishes to use such a coffee machine for brewing iced coffee, the user may wish to fill the receptacle with ice so that the freshly brewed coffee is immediately chilled. Coffee may still be brewed as hot coffee, but would then be chilled after being dispensed into the receptacle. Where the warming plate is active, any ice in the receptacle would melt. As such, even if the warming plate is deactivated after completing a brew process, ice would melt prior to receiving the brewed coffee.

Further, because a single heating element is used for both heating the water and for heating the warming plate, the coffee machine cannot heat water without activating the warming plate as well.

There is a need for a coffee machine that can provide the benefit of a warming plate for hot coffee, the ability to brew iced coffee, and the efficiencies of using a single heating element for both the warming plate and the brewing chamber.

SUMMARY

In some embodiments, a coffee machine is provided which includes a hot water source for providing hot water for brewing, a warming plate for warming a receptacle for receiving coffee, and heating element for heating both water at the hot water source and the warming plate. Also provided is a removable insulator for insulating the warming plate from the receptacle. The removable insulator insulates the warming plate from the receptacle in an iced coffee configuration and the removable insulator is removed from the warming plate in a hot coffee configuration.

In some embodiments, the removable insulator is a silicone pad. In some embodiments, the removable insulator is textured so as to provide air pockets between the warming plate and the receptacle.

In some embodiments, the warming plate has a raised border. The insulator may then be sized so as to fit within the raised border. In some such embodiments, the receptacle is provided as well, and the receptacle has a base section sized to fit within the raised border. The receptacle then has a body with a cross section larger than an area within the raised border and a shoulder segment linking the body with the base section.

In some embodiments, the coffee machine further includes a water source. The hot water source then comprises a hose extending from the water source to a brewing chamber, wherein a portion of the hose is integrated into or located adjacent the heating element. Accordingly, the water in the hose is heated prior to reaching the brewing chamber.

In some such embodiments, the heating element is located between the portion of the hose and the warming plate. In some such embodiments, the heating element is an elongated element fixed to a lower surface of the warming plate.

DETAILED DESCRIPTION OF THE PREFERRED EMBODIMENTS

Figure 1:
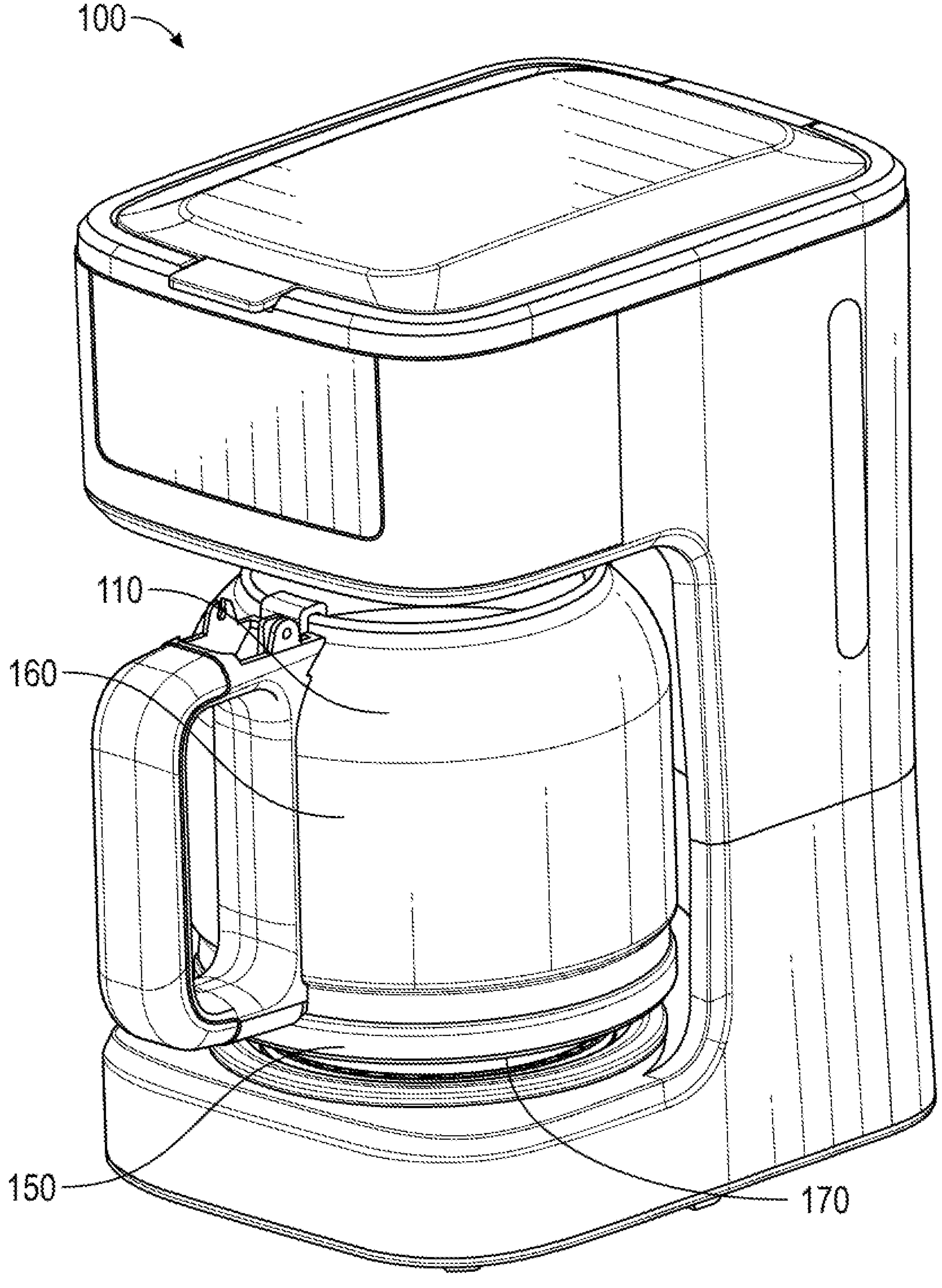
FIG. 1 shows a coffee machine in accordance with this disclosure with a receptacle in place for receiving coffee.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 2:
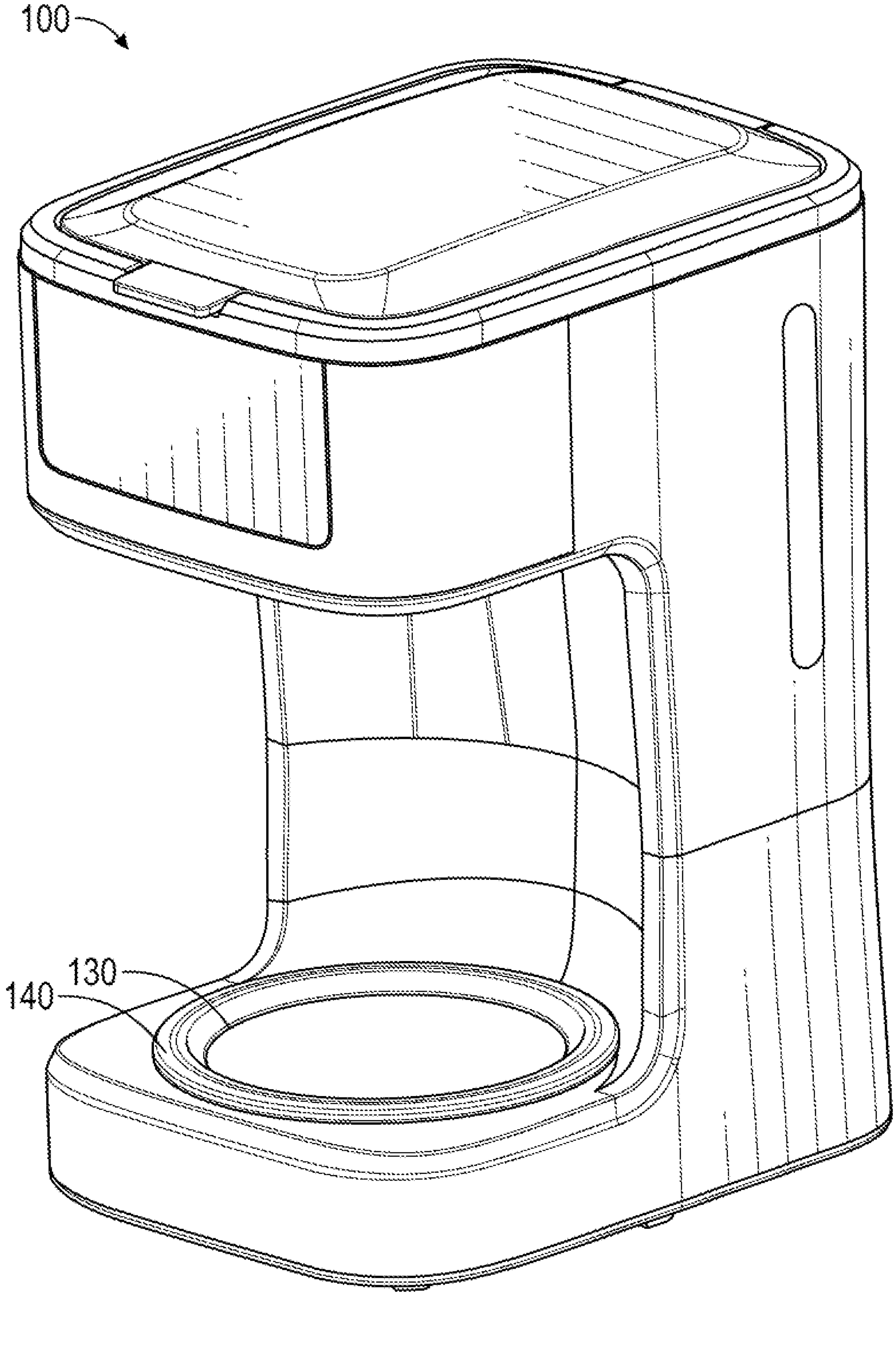
FIG. 2 shows the coffee machine of FIG. 1 in a hot coffee configuration with the receptacle removed.
Figure 3:
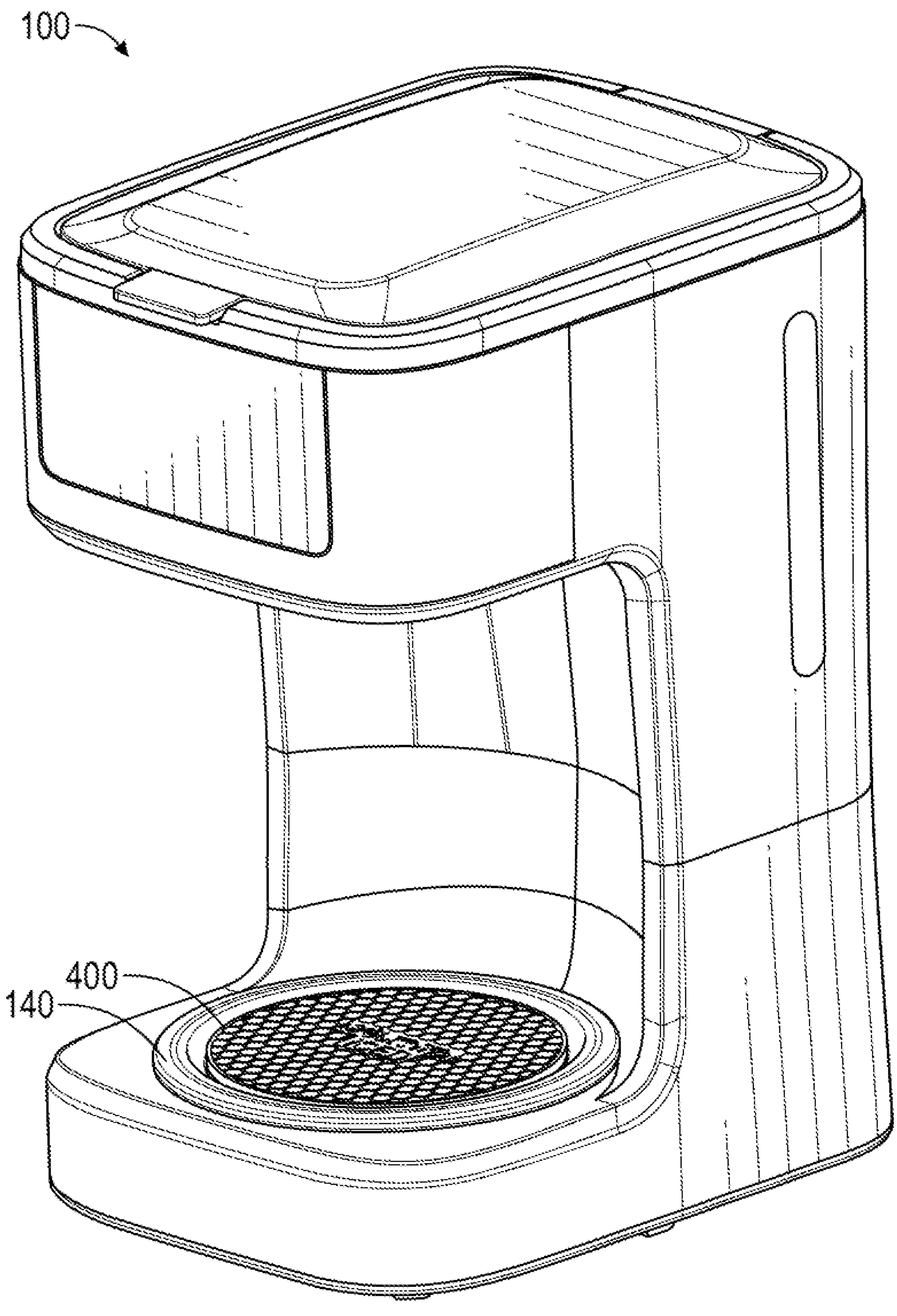
FIG. 3 shows the coffee machine of FIG. 1 in an iced coffee configuration.

FIG. 1 shows a coffee machine 100 in accordance with this disclosure with a receptacle 110, such as a carafe, in place for receiving coffee from a brewing chamber 610. FIG. 2 shows the coffee machine 100 in a hot coffee configuration with the receptacle 110 removed. FIG. 3 shows the coffee machine 100 in an iced coffee configuration.

Figure 4:
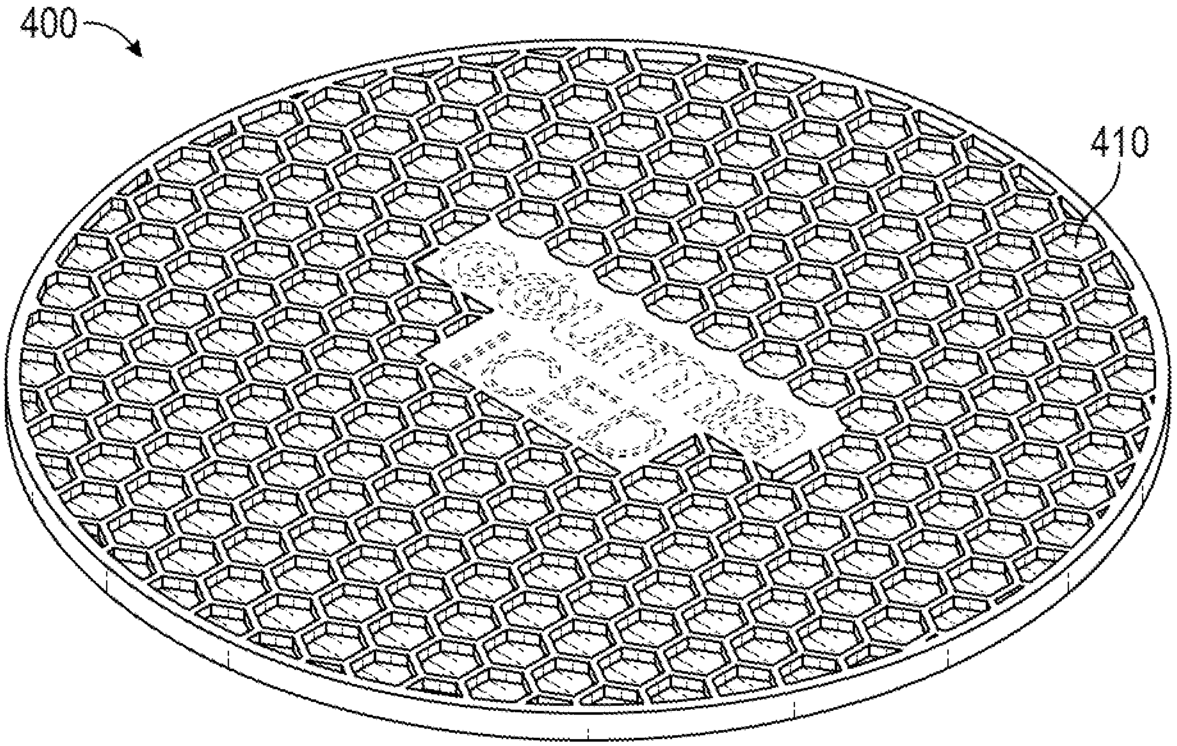
FIG. 4 shows an insulator for use in the coffee machine of FIG. 1.
Figure 5:
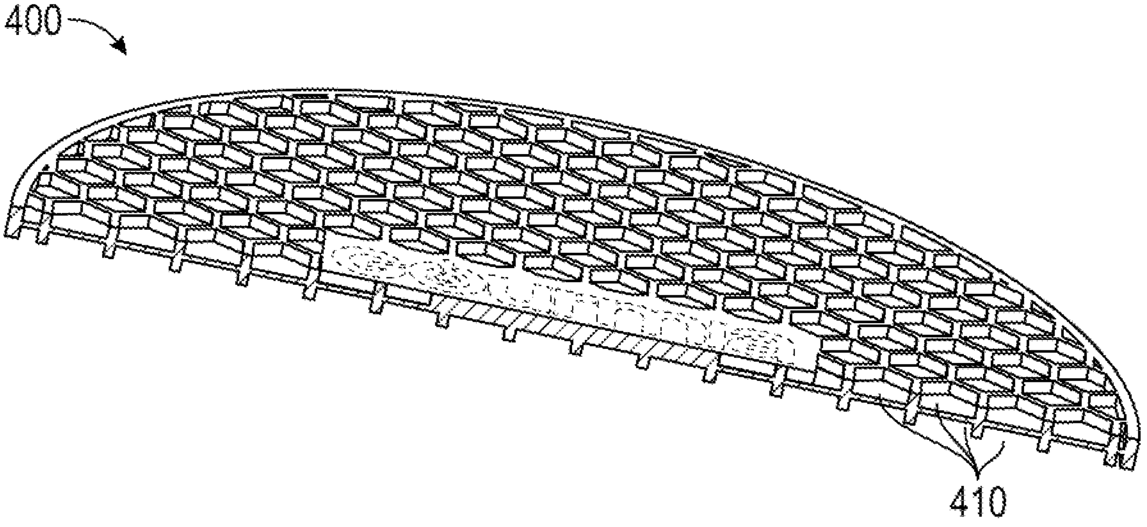
FIG. 5 shows a sectioned view of the insulator of FIG. 4.

FIG. 4 shows an insulator 400 for use in the coffee machine 100 of FIG. 1. FIG. 5 shows a sectioned view of the insulator 400.

Figure 6:
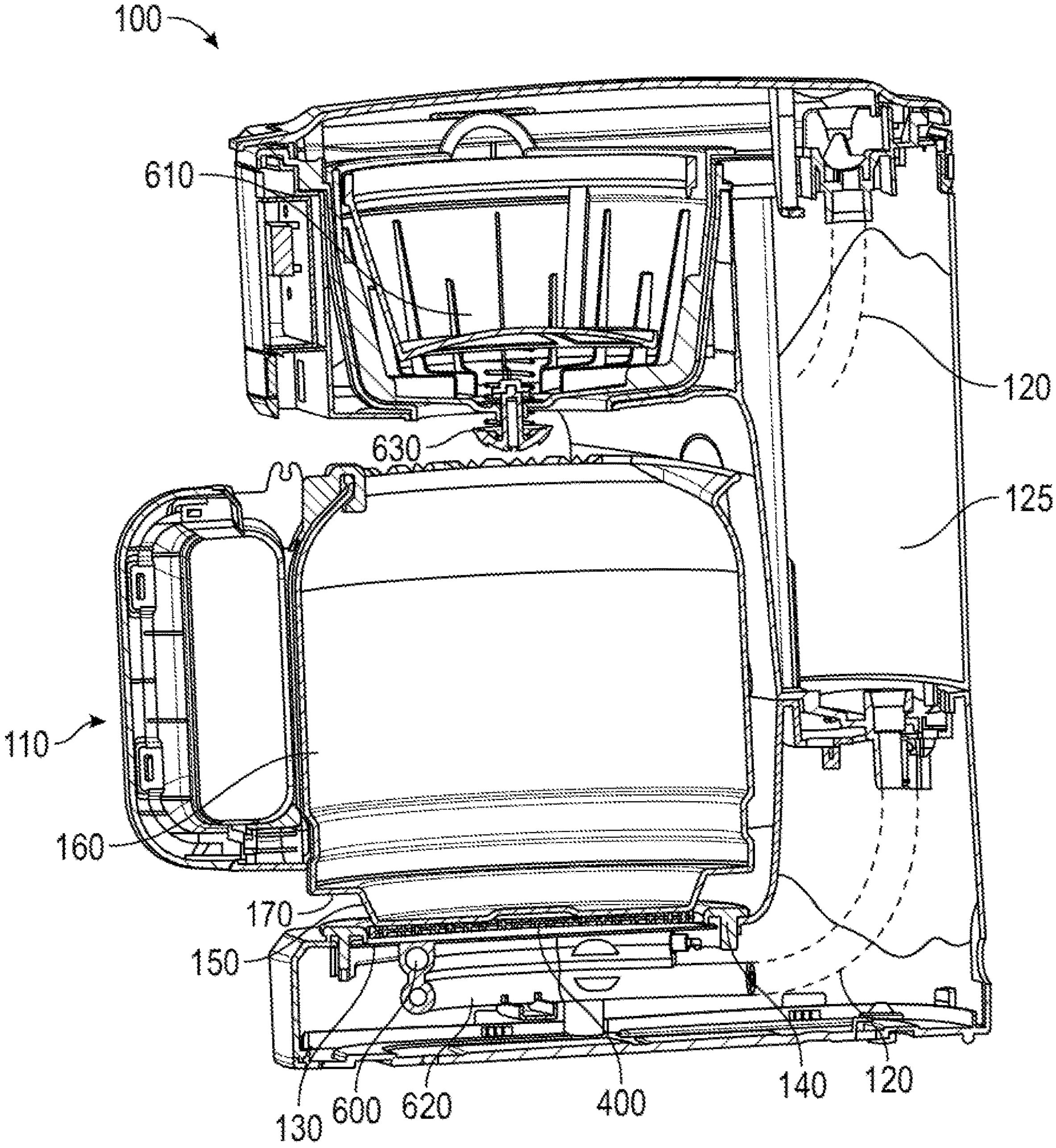
FIG. 6 shows a sectioned view of the coffee machine of FIG. 1.
Figure 7:
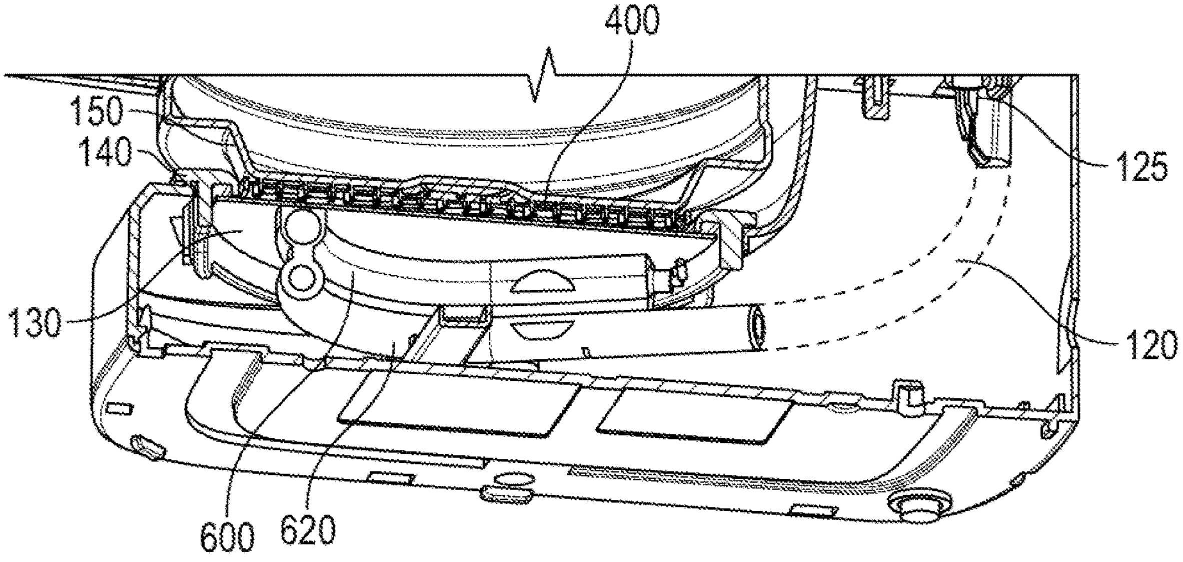
FIG. 7 shows an enlarged view of a portion of the sectioned view of FIG. 6 including a heating element.

FIG. 6 shows a sectioned view of the coffee machine 100 of FIG. 1. FIG. 7 shows an enlarged view of a portion of the sectioned view of FIG. 6 including a heating element 600.

As shown, the coffee machine 100 includes a receptacle 110 for receiving brewed coffee and provides a hot water source 120 for providing hot water for brewing, a warming plate 130 for warming the receptacle 110, and a heating element 600 for heating both the water at the hot water source 120 and the warming plate 130.

The coffee machine 100 further includes a removable insulator 400 for insulating the warming plate 130 from the receptacle 110. The coffee machine 100 then has a hot coffee configuration, shown in FIG. 2, in which the removable insulator 400 is removed and the warming plate 130 is exposed. The coffee machine 100 has a separate iced coffee configuration, shown in FIG. 3, in which the removable insulator 400 is provided on the warming plate 130 and the receptacle 110 is placed on top of the removable insulator, such that the receptacle is insulated from the warming plate by the removable insulator.

The removable insulator 400 may be a pad formed from an insulating material, such as silicone. The removable insulator 400 may further be textured, so as to provide air pockets 410 between the warming plate 130 and the receptacle 110 when the coffee machine 100 is in the iced coffee configuration of FIG. 3.

In some embodiments, such as that shown, the warming plate 130 of the coffee machine 100 has a raised border 140. The raised border 140 then defines an area of the warming plate 130. The removable insulator 400 is then sized to fit within the raised border 140.

In some such embodiments, the receptacle 110 is included as a component of the coffee machine 100 and is provided with a base section 150 sized to fit within the raised border 140 of the warming plate 130. Accordingly, the base section 150 has a base area less than or equal to the area of the warming plate 130. The receptacle 110 then has a body 160 with a cross section larger than the area of the warming plate 130 and a shoulder segment 170 linking the body 160 with the base section 150.

Internal components of the coffee machine 100 are shown in the section views of FIGS. 6 and 7. Accordingly, the heating element 600 is seen under the heating pad 130.

The hot water source 120 receives unheated water from a water source 125. Such a water source may be a water line attached to the coffee machine 100 or it may be a water tank 125 integrated into the coffee machine, as in the embodiment shown. The hot water source 120 typically comprises a hose extending from the water source 125 to a brewing chamber 610. A portion 620 of the hose 120 is then integrated into or located adjacent the heating element 600, such that water in the hose is heated prior to reaching the brewing chamber 610 as the water travels from the water source 125 to the brewing chamber.

As shown, the heating element 600 is typically located between the portion 620 of the hose 120 and the warming plate 130. The portion 620 of the hose 120 is then spaced apart from the warming plate 130 by the heating element 600.

In some embodiments, the heating element 600 may be an elongated element fixed to a lower surface of the warming plate 130. The heating element 600 may be a resistive element, and the elongated configuration may allow for the portion 620 of the hose 120 to run alongside the heating element for an extended length, such that heat can transfer from the heating element to water in the hose. Similarly, the extended length of the heating element 600 allows the heating element to contact or be fixed to the lower surface of the warming plate 130 across a larger area.

During use, water to be used as a brewing liquid is drawn from the water source 125 and enters the hose of the hot water source 120. The water than passes through the portion 620 of the hose 120 adjacent the heating element 600 and is thereby heated. The water is then provided to the brewing chamber 610 and is used to brew coffee within the brewing chamber 610.

When a receptacle 110 is located in the coffee machine 100, such a receptacle 110 typically lifts a dispensing valve 630. When coffee is brewing in the brewing chamber 610, or when coffee has already brewed, such coffee is then dispensed to the receptacle 110 by way of the dispensing valve 630. Where the coffee machine 100 is in a hot coffee configuration, the coffee is then dispensed to the receptacle 110 where it is warmed by the warming plate 130. Where the coffee machine 100 is in the iced coffee configuration, the coffee is then dispensed to the receptacle, which would typically contain ice, and which is insulated from the warming plate 130 by the removable insulator 400.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A coffee machine comprising:

a hot water source for providing hot water for brewing;

a warming plate for warming a receptacle for receiving coffee;

a heating element for heating both water at the hot water source and the warming plate;

a removable insulator for insulating the warming plate from the receptacle;

wherein the removable insulator insulates the warming plate from the receptacle in an iced coffee configuration and wherein the removable insulator is removed from the warming plate in a hot coffee configuration, and wherein the removable insulator is textured so as to provide a plurality of first air pockets between the warming plate and the receptacle, the plurality of first air pockets being separated from each other in a plan view of the warming plate, wherein the removable insulator includes:

a base plate, and a plurality of second air pockets that are separated from each other in the plan view of the warming plate, and wherein the plurality of first air pockets are disposed between the base plate and the receptacle, and the plurality of the second air pockets are disposed between the base plate and the warming plate.

2. The coffee machine of claim 1, wherein the removable insulator is a silicone pad.

3. The coffee machine of claim 1, wherein the warming plate has a raised border, and wherein the removable insulator is sized to fit within the raised border.

4. The coffee machine of claim 3 further comprising the receptacle, and wherein the receptacle has a base section sized to fit within the raised border, and wherein the receptacle has a body with a cross section larger than an area within the raised border, and wherein the receptacle has a shoulder segment linking the body with the base section.

5. The coffee machine of claim 1 further comprising a water source, and wherein the hot water source comprises a hose extending from the water source to a brewing chamber, and wherein a portion of the hose is integrated into or located adjacent the heating element, such that water in the hose is heated prior to reaching the brewing chamber.

6. The coffee machine of claim 5, wherein the heating element is located between the portion of the hose and the warming plate.

7. The coffee machine of claim 6, wherein the heating element is an elongated element fixed to a lower surface of the warming plate.

* * * * *